M. L. DAVIS, Jr.
LOCOMOTIVE DRIVING WHEEL.
APPLICATION FILED AUG. 28, 1915.

1,180,763.

Patented Apr. 25, 1916.
2 SHEETS—SHEET 1.

WITNESSES
Frank C. Palmer
A. L. Kitchin

INVENTOR
M. L. Davis Jr.
BY
ATTORNEYS

M. L. DAVIS, Jr.
LOCOMOTIVE DRIVING WHEEL.
APPLICATION FILED AUG. 28, 1915.
1,180,763.
Patented Apr. 25, 1916.
2 SHEETS—SHEET 2.
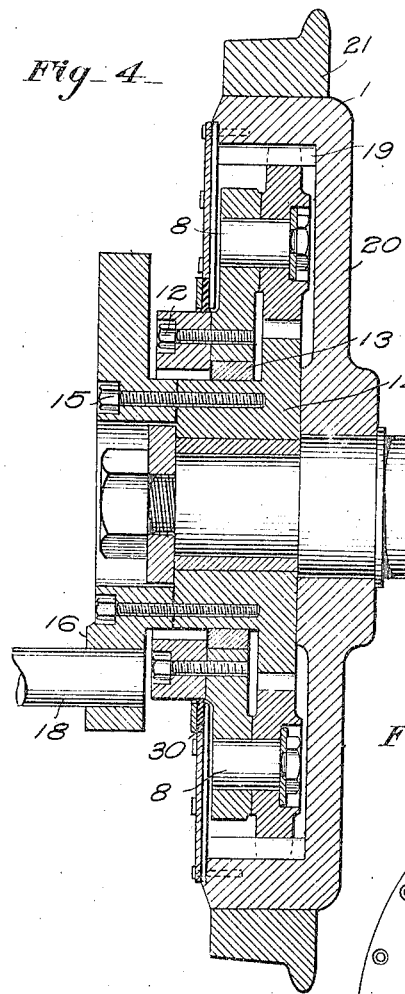
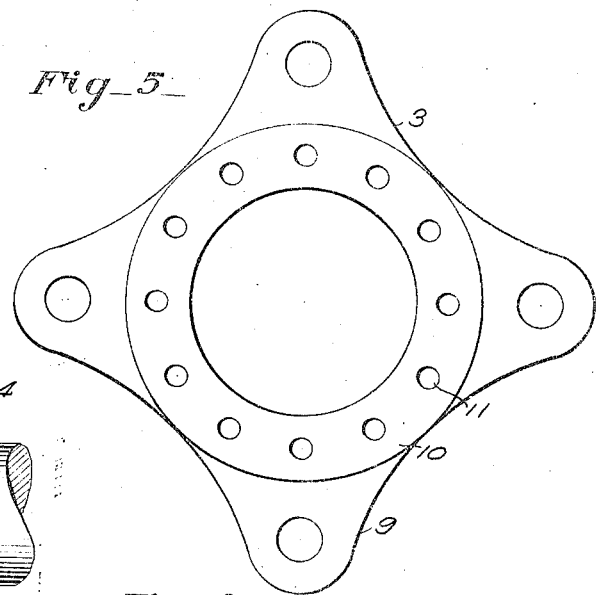
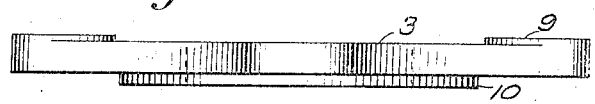
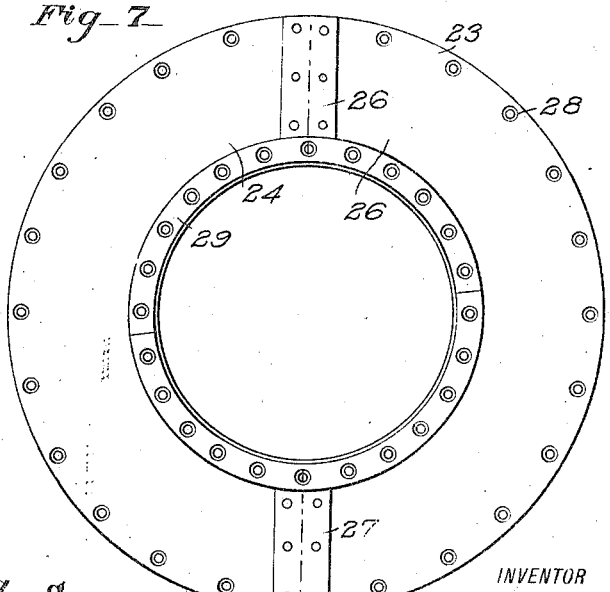
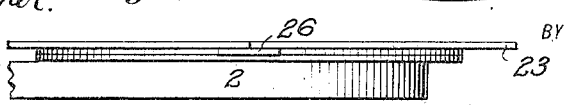
WITNESSES
Frank C. Palmer.
A. L. Kitchin.
INVENTOR
M. L. Davis Jr.
BY
ATTORNEYS

UNITED STATES PATENT OFFICE.

MATTHEW L. DAVIS, JR., OF OAK GROVE, ALABAMA.

LOCOMOTIVE DRIVING-WHEEL.

1,180,763.

Specification of Letters Patent.

Patented Apr. 25, 1916.

Application filed August 28, 1915. Serial No. 47,733.

*To all whom it may concern:*

Be it known that I, MATTHEW L. DAVIS, Jr., a citizen of the United States, and a resident of Oak Grove, in the county of Mobile and State of Alabama, have invented a new and Improved Locomotive Driving-Wheel, of which the following is a full, clear, and exact description.

This invention relates to a driving mechanism for traction wheels and particularly to a locomotive driving wheel and mechanism, and has for an object the construction and arrangement of an improved driving wheel where the friction is reduced to a minimum.

Another object in view is to provide a driving wheel propelled through the instrumentality of a plurality of gears of a simple strong construction.

A still further object in view is to provide an improved driving construction including the wheel structure for the drivers of a locomotive, the same including an internally geared body with a master driving gear and intermediate connecting driving pinions, the whole structure being increased for the protection of the various gear teeth and for allowing the parts to operate in oil if desired.

Figure 1:
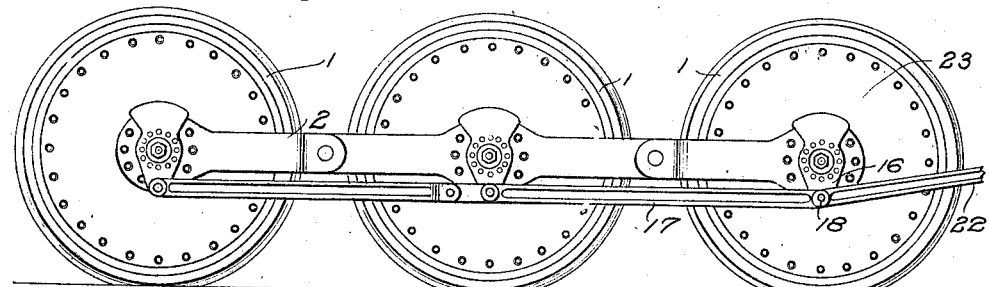
Figure 2:
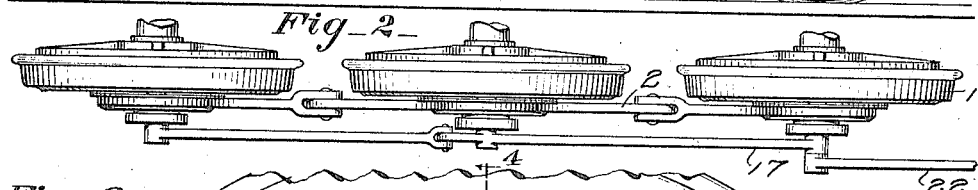
Figure 3:
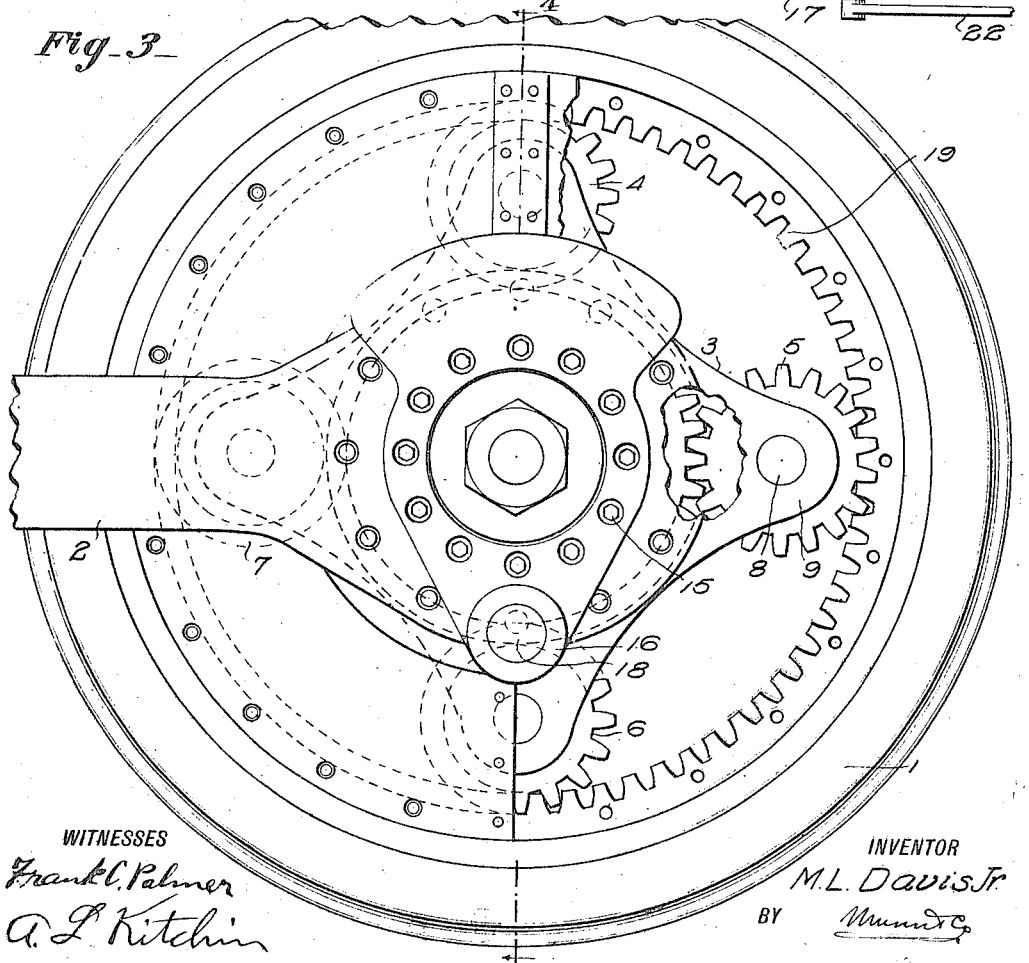

In the accompanying drawings:—Figure 1 is a side view of a plurality of wheels and associated parts disclosing an embodiment of the invention; Fig. 2 is a top plan view of the structure shown in Fig. 1; Fig. 3 is an enlarged side view of one of the wheels shown in Fig. 1, certain parts being broken away for better illustrating the construction; Fig. 4 is a vertical section through the structure shown in Fig. 3, the same being taken on the line 4—4 thereof; Fig. 5 is a plan view of a pinion supporting spider; Fig. 6 is an edge view of the structure shown in Fig. 5; Fig. 7 is a plan view of a covering plate for inclosing the various gears; Fig. 8 is an edge view of the structure shown in Fig. 7, a connecting bar being shown associated therewith.

Referring to the accompanying drawings by numerals, 1 indicates a wheel constructed according to the invention. A number of these wheels may be associated together as shown in Fig. 1 and when associated together are connected by a bar 2 hinged or pivotally connected together between the respective wheels so as to allow an independent up and down movement of each wheel. Bar 2, however, is bolted or otherwise rigidly secured to the pinion spider 3 (Fig. 5) hereinafter fully described, and holds said spider in a given position continually so as to properly space the various pinions 4, 5, 6 and 7. These pinions, as shown in Figs. 3 and 4, are journaled on suitable pins 8 mounted in the various arms 9 of spider 3. It will be observed that the spider 3 is provided with a boss or raised portion 10 which has formed therein a plurality of apertures 11 for receiving the bolts 12, which bolts also pass through the bar 2 so that the spider is rigidly secured to the bar 2 but in such a manner as to be readily removed therefrom.

The spider 3 is arranged to rest upon a suitable bearing ring 13 which may be of brass or other suitable metal, which bearing ring rests in turn upon the hub of the master driving gear 14. A plurality of bolts 15 extend through the crank member 16 and into the hub of the master gear 14 so that when the side rod 17 is connected to the crank 16 through the crank pin 18 power may be transmitted from the side rod 17 to the master gear and from thence to the various pinions 4, 5, 6 and 7 which are continually in mesh therewith. The pinions just mentioned are also continually in mesh with a rack 19 preferably formed integral with the body 20 of wheel 1. It is of course evident that a separate piece could be provided with a rack or gear teeth and secured in place. A suitable rim 21 is provided which presents a strong wearing surface.

Whenever the side rod 17 is actuated by the connecting rod 22 power will be transmitted to the crank 16 and from thence through bolts 15 to the master gear 14. From gear 14 power will be transmitted to the pinions 4 to 7, inclusive, and from thence to rack 18, body 20 and rim 21, thus causing a rotation of the wheel. It will be observed that the spider 3 is held against rotation and consequently holds the various pinions 4 to 7 in their same relative position and properly spaced apart, whereby the body 20 will receive movement regardless of the position thereof.

In order that the parts may operate in oil if desired and to properly protect the various moving parts against dust and the like, a covering member 23 is provided, as shown in Figs. 7 and 8, said covering member being formed from semicircular plates 24 and 25 connected together by overlapping strips 26 and 27. The covering plate 23 is provided with a plurality of apertures 28 which are designed to receive securing screws which extend therethrough and into body 20 for holding the plate in position, as shown in Fig. 4. A ring 29 is provided and is held in place by suitable screws, said ring clamping in position a packing member 30 which may be of fiber or any other suitable material. The screws or bolts passing through the apertures in ring 29 engage the covering plate 23 which is held in place thereby, while the covering plate 23 is bolted or screwed to the body 20, as above set forth.

By the construction and arrangement of the parts described it will be observed that the same may be quickly assembled and quickly removed whenever desired so that the respective parts may be renewed from time to time and repairs made whenever necessary. When the parts are assembled, as shown in Fig. 1 the movement of the connecting rod 22 and the side rod 17 is reversed to that usually made by an ordinarily constructed engine gearing by reason of the fact that there is arranged only one set of intermediate gears 4 to 7, inclusive, but the movement of these rods could be reversed by adding another set of intermediate gears for reversing the driving movement. However, in an ordinary locomotive the direction of movement of the connecting rod 22 is of no importance as the piston and associated parts work in the same manner and will give the same efficiency. It is evident that by changing the diameter of the master gear 14 or of the pinions, or the diameter of both sets of members just mentioned, the speed of drive may be varied. Other slight rearrangements and changes may be made without departing from the spirit of the invention.

What I claim is:—

1. In a driving wheel of the character described, a body formed with a hollow or recessed portion, a rack arranged on the periphery of said hollow or recessed portion, a plurality of pinions continually meshing with said rack, a master gear meshing with all of said pinions, said master gear being adapted to rest on the axle extending from said body, said master gear being also provided with an elongated hub, a spider for supporting and spacing apart said pinions, said spider being supported by said hub, means for preventing said spider from rotating, and means connected with said hub for rotating said master gear, whereby power will be transmitted to said body for rotating the same.

2. In a drive wheel of the character described, a body formed hollow and provided with an annular rack, a plurality of pinions continually meshing with said rack, a spider for holding said pinions in a predetermined position relative to each other and to the rack, a master gear arranged centrally of said pinions and continually meshing therewith, means for preventing the rotation of said spider, and a crank member removably secured to said master gear.

3. In a driving wheel of the character described, a body formed hollow and provided with an internal rack, a plurality of pinions meshing with said rack, a master gear continually meshing with all of said pinions, a spider supported by the hub of said master gear, means extending through said spider and said pinions for causing the spider to hold the pinions in a predetermined position, a supporting bar removably connected with said spider for preventing the rotation thereof, and a power member connected with said master gear for rotating said gear.

4. In a drive wheel of the character described, a body formed hollow, an annular rack arranged in said body and formed integral therewith, a plurality of pinions meshing with said rack, a master gear continually meshing with said pinions for operating the same, means for driving said master gear, a cover removably connected with said body and covering said pinions, a packing arranged adjacent the central or hub part of the driver, and means for clamping the packing in position whereby oil in said body cannot escape therefrom.

5. In a drive wheel of the character described, the combination with an axle adapted to extend through the drive wheel, said drive wheel being formed hollow and provided with an annular rack interiorly, a plurality of pinions meshing with said rack continually, a master gear loosely mounted on said axle and continually meshing with said pinions, said master gear having an elongated hub, a friction ring arranged on said hub, a spider resting on said friction ring, means extending from said spider and engaging said pinions for rotatably supporting the pinions, a bar connected with said spider for preventing the rotation thereof, and a power crank connected with said master gear for rotating the same.

In testimony whereof I have signed my name to this specification in the presence of two subscribing witnesses.

MATTHEW LIVINGSTON DAVIS, Jr.

Witnesses:
J. L. MAY,
A. S. BOUTER.